US007624216B2

(12) United States Patent
Yoshikawa et al.

(10) Patent No.: US 7,624,216 B2
(45) Date of Patent: Nov. 24, 2009

(54) HOST CONTROLLER

(75) Inventors: Hiroto Yoshikawa, Tokyo (JP);
Hiroyuki Yasoshima, Tokyo (JP)

(73) Assignee: Zentek Technology, Tokyo (JP)

( * ) Notice: Subject to any disclaimer, the term of this patent is extended or adjusted under 35 U.S.C. 154(b) by 195 days.

(21) Appl. No.: 11/570,106

(22) PCT Filed: Sep. 27, 2005

(86) PCT No.: PCT/JP2005/017682

§ 371 (c)(1),
(2), (4) Date: Dec. 6, 2006

(87) PCT Pub. No.: WO2006/035738

PCT Pub. Date: Apr. 6, 2006

(65) Prior Publication Data

US 2007/0233907 A1  Oct. 4, 2007

(30) Foreign Application Priority Data

Sep. 28, 2004  (JP) ............................. 2004-281481

(51) Int. Cl.
*H05K 7/10* (2006.01)
(52) U.S. Cl. .................................... 710/301
(58) Field of Classification Search ......... 710/301–304, 710/315, 316–317
See application file for complete search history.

(56) References Cited

U.S. PATENT DOCUMENTS

| 3,618,045 | A | * | 11/1971 | Campbell et al. ........... 712/233 |
| 5,167,024 | A | | 11/1992 | Smith et al. |
| 5,550,861 | A | | 8/1996 | Chan et al. |
| 5,630,174 | A | * | 5/1997 | Stone et al. .................. 710/63 |
| 5,748,913 | A | * | 5/1998 | Shibahara ................... 710/301 |
| 5,922,062 | A | * | 7/1999 | Evoy .......................... 710/305 |
| 6,292,863 | B1 | | 9/2001 | Yukio et al. |
| 6,363,452 | B1 | * | 3/2002 | Lach .......................... 710/316 |
| 6,658,520 | B1 | * | 12/2003 | Bennett ...................... 710/312 |
| 6,721,820 | B2 | * | 4/2004 | Zilberman et al. ............ 710/22 |
| 6,764,346 | B2 | * | 7/2004 | Fujita et al. ................. 439/638 |
| 6,820,148 | B1 | * | 11/2004 | Cedar et al. ................. 710/104 |
| 6,824,063 | B1 | * | 11/2004 | Wallace et al. .............. 235/487 |
| 6,965,956 | B1 | * | 11/2005 | Herz et al. .................... 710/74 |
| 6,973,658 | B2 | * | 12/2005 | Nguyen ...................... 719/327 |
| 7,069,369 | B2 | * | 6/2006 | Chou et al. ................. 710/301 |
| 7,089,345 | B1 | * | 8/2006 | Lynn .......................... 710/316 |
| 7,103,691 | B2 | * | 9/2006 | Zhu ............................ 710/241 |
| 7,110,262 | B2 | * | 9/2006 | Matsumoto et al. .......... 361/737 |

(Continued)

FOREIGN PATENT DOCUMENTS

AU  1783602  5/2004

(Continued)

*Primary Examiner*—Paul R Myers
(74) *Attorney, Agent, or Firm*—Lucas & Mercanti, LLP

(57) ABSTRACT

A versatile SDIO host controller capable of connecting to standardized general interfaces is provided.

An SDIO host controller as a one-chip semiconductor integrated circuit device comprising: at least one core of an SDIO host, the core including an SD host engine and an SD host register set and memory that control the SD host engine; a plurality of CPU interfaces that control the SDIO host; and at least one selector that selects among the CPU interfaces. In particular, the SDIO host controller preferably comprises at least an ATA interface and an ATA-SD protocol conversion engine.

7 Claims, 9 Drawing Sheets

U.S. PATENT DOCUMENTS

| | | | |
|---|---|---|---|
| 7,111,142 B2 * | 9/2006 | Spencer et al. | 711/170 |
| 7,117,311 B1 * | 10/2006 | Rankin et al. | 711/146 |
| 7,152,801 B2 * | 12/2006 | Cuellar et al. | 235/492 |
| 7,225,357 B2 * | 5/2007 | Tai et al. | 714/25 |
| 7,257,660 B2 * | 8/2007 | Chang et al. | 710/301 |
| 2002/0111771 A1 * | 8/2002 | Huang et al. | 702/186 |
| 2003/0046599 A1 | 3/2003 | Takamiya et al. | |
| 2003/0057005 A1 | 3/2003 | Hiroki et al. | |
| 2005/0033917 A1 * | 2/2005 | Takeuchi | 711/115 |
| 2005/0037647 A1 * | 2/2005 | Le | 439/131 |
| 2006/0020720 A1 * | 1/2006 | Stallmo et al. | 710/36 |

FOREIGN PATENT DOCUMENTS

| | | |
|---|---|---|
| EP | 0723232 | 7/1996 |
| EP | 1300852 A2 | 9/2003 |
| GB | 2302744 A | 1/1997 |
| JP | 0929043 | 7/1999 |
| JP | 11-259605 A | 9/1999 |
| JP | 2003-076952 A | 3/2003 |
| JP | 2004536363 | 12/2004 |
| WO | WO0241154 A2 | 5/2002 |

* cited by examiner (a)

(b)

(a)

(b)

(a)

(b)

(a)

100 (SD/SDIO HOST APPARATUS)

102 (SD/SDIO CARD APPLICATION DEVICES)

(b)

103 (SD/SDIO HOST CONTROLLER)

104 (SD/SDIO CONTROLLER)

HOST CONTROLLER

TECHNICAL FIELD

The present invention mainly relates to an SDIO host controller device, which is a semiconductor device for controlling SD card application apparatus in conformity with the SD memory card or SDIO, and to application apparatus and so forth that use this SDIO host controller device.

BACKGROUND ART

In these years, Personal Digital Assistants (PDAs) and notebook computers with an SD bus slot are becoming widespread. The SD bus slot conforms to the "SD memory card (Secure Digital Memory Card)" or the upward compatible "SDIO card (Secure Digital Input Output Card)," for which the card shape and communication protocol are defined by a uniform standard (for convenience, slots that connect to an SD bus are herein collectively referred to as "SD slots"). This uniform standard is herein referred to as the "SD standard." More accurately, it means the international standard defined by the SD Association.

FIG. 9(a) is a diagram showing exemplary SD host apparatus 100 (e.g., a PDA 100a, a notebook computer 100b, an SD memory card reader 100c, etc.) and SD card application apparatus 102 (a wireless LAN card 102a, an SD memory card 102b, a mini-SD memory card 102c, etc.). Each SD host apparatus 100 has an SD slot 101 with its size and shape defined by the SD standard, and the various SD card application apparatus 102 are connected to the SD slot.

Various peripheral apparatus have been developed as the SD card application apparatus 102, for example, the wireless LAN card 102a and the SD memory cards 102b and 102c, as well as a radio broadcast receiving card, a GPS card, and a camera card (all not shown).

Therefore, any host apparatus that have the SD slot 101 and have required driver software installed thereon can control these peripheral apparatus (SD card application apparatus) at any time.

For small host apparatus like mobile phones, there are standards such as the mini-SD slot having the size slightly smaller than the normal SD slot. However, since the communication protocol itself conforms to the SD standard, whether the slot shape is of the mini-SD or the normal SD slot will not be considered unless otherwise stated.

FIG. 9(b) is a diagram schematically showing a host apparatus 100 being connected with an SD card application apparatus 102 via an SD bus 105. The host apparatus 100 has the SD slot 101 and is used with the SD card application apparatus 102 inserted thereto.

The host apparatus 100 includes a semiconductor chip called an SDIO host controller. On the other hand, the SD card application apparatus 102 includes a semiconductor chip called an SD or SDIO controller (whichever is possible but hereafter uniformly referred to as an SDIO controller for convenience).

The SDIO host controller and the SDIO controller are designed to perform data transfer always in a one-to-one relationship while recognizing commands issued by each other. At this point, the SD bus differs from buses that allow one-to-N connection, such as the USB (Universal Serial Bus) described later.

Once the SDIO card application apparatus is inserted into the host apparatus, the SDIO host controller in the host apparatus recognizes the card application apparatus 102 by exchanging commands and data with the SDIO controller in the card.

Conventional SDIO host controllers (or SD host controllers) have been quite simple with only minimum components, including an SDIO host core (SD host engine), one SD bus interface, one CPU interface that connects a local bus for connecting to the CPU of the host apparatus, a clock, a register controller, and so forth (for example, see FIG. 1 of a patent document 1).

[Patent Document 1]: Japanese Patent Laid-Open No. 2003-76952

[Patent Document 2]: WO03/019841

In addition to the local bus (such as a PCI bus or a generic CPU bus), the CPU of the host apparatus often has various bus interfaces that allow high-speed bulk communication, such as an ATA interface, a USB interface, and an IEE 1394 interface.

The USB interface is a versatile interface that can connect to storage devices and various other apparatus, for example, input/output devices such as a mouse and a keyboard, printer scanners, and memory card reader/writers.

Moreover, many of versatile operating systems that operate on the host apparatus in these years include, as standard equipment, host controller devices and their device drivers for the hosts of these standard interfaces (such as an IDE host and a USB host).

On the other hand, there are limited apparatus in which the SD bus interface can be connected. Therefore, it is expected that the ability of connecting the SD card application apparatus to those general interfaces will increase the variety of usage of the SD card application apparatus and will be applied to development of various products.

The primary technical object of the present invention is to provide a versatile SDIO host controller capable of connecting to standardized general interfaces.

DISCLOSURE OF THE INVENTION

An SDIO host controller according to the present invention is a one-chip semiconductor integrated circuit device characterized by comprising: at least one core 16 of an SDIO host, the core 16 including an SD host engine 10 and an SD host register set 11 and memory 12 that control the SD host engine; a plurality of CPU interfaces 13a, 13b, . . . that control the SDIO host; and at least one selector (MUX) 14 that selects among the CPU interfaces.

The CPU interfaces preferably include at least an ATA interface and an ATA-SD protocol conversion engine. Including the ATA interface and the ATA-SD protocol conversion engine in this manner allows a host apparatus with an IDE host to recognize the SDIO host controller according to the present invention. Then, since the SDIO host controller is recognized as an IDE device, no driver software or firmware need not to be installed when the target device is an SD memory card.

In this case, the ATA interface preferably includes an Ultra DMA controller. This supports the Ultra DMA transfer mode and thereby increases the data transfer rate.

Besides the ATA interface, the CPU interface preferably further includes a PCI bus interface and/or a general microcomputer interface (generic CPU interface) so that SDIO card application apparatus may be controlled via these interfaces.

The SDIO host controller may comprise: two or more cores 16 (16a and 16b) of an SDIO host, each core 16 including an SD host engine 10 and an SD host register set 11 and memory 12 that control the SD host engine; and two or more selectors 14. In this manner, the host apparatus may have two SD slots.

Thus, the SDIO host controller according to the present invention may independently control target devices connected to the respective SD slots by using any of the interfaces respectively.

An SD memory card duplication apparatus according to the present invention is an apparatus for duplicating data recorded on an SD memory card, characterized by comprising: at least two SDIO host controllers including an ATA interface and an ATA-SD protocol conversion engine; a logic circuit functioning as an IDE host; and a selector circuit.

In this case, the IDE host and the selector circuit may be composed of an FPGA (Field Programmable Gate Array). Since ATA commands required for implementing this duplication apparatus are only ATA essential commands and several commands attributed to the characteristics of an SD memory card as a removable device, the duplication apparatus may be readily implemented with an FPGA. Of course, it may also be composed of a CPU or a microcomputer.

If a comparator and two buffers are further provided in the IDE host controller of this apparatus so that address-by-address data is compared between a duplication source and a duplication target on a hardware basis, verification may be faster than verification on a software basis.

A method of duplicating a memory card according to the present invention is, in a memory card duplication apparatus comprising: an IDE host controller; a reading memory card host controller connected with the IDE host controller via an ATA interface; a writing memory card host controller connected with the IDE host controller via an ATA interface and directly connected with the reading host controller by a data bus; and a selector circuit, characterized by comprising the steps of:

(a) the IDE host controller issuing a read DMA command to the reading host controller that reads a memory card containing data to be duplicated;

(b) on receiving the read DMA command (Read DMA), the reading host controller reading the data to be duplicated from the memory card containing the data and accumulating the data in a buffer of the reading host controller;

(c) once the data is accumulated, the reading host controller making a DMA request signal (dmarq1);

(d) after receiving the DMA request signal (dmarq1), the IDE host controller issuing a write DMA command (Write DMA) to the writing host controller; and (e) after receiving a DMA request signal (dmarq2) from the reading host controller, the IDE host controller issuing a data transfer start signal (dmack) while electrically coupling "iordy1" and "dior2" by switching the selector circuit.

Thus, what is characteristic is that, while the IDE host controller passes the commands, data during the data transfer is directly transferred from the reading host controller to the writing host controller without the intervention of the IDE host controller. In this manner, since data is transferred on a hardware basis, data transfer efficiency is extremely high, and fast transfer is possible.

An SD memory card reader/writer according to the present invention is characterized in that an SDIO host controller according to the present invention (comprising an ATA interface and an ATA-SD protocol conversion engine) and a USB controller having an ATA bridge function are connected by an Ultra DMA bus via respective ATA interfaces of the controllers.

Since the USB controller is being recognized by a USB host apparatus, no driver software or firmware is required. In addition, the Ultra DMA transfer mode dramatically increases the reading and writing speed.

It is expected that the SDIO host controller device according to the present invention will further enhance the versatility compared with the conventional art and will be applied to various host apparatus. Furthermore, novel application products that use the SDIO host controller device according to the present invention may be provided, for example, an SD memory card duplication apparatus capable of high-speed duplication of SD memory cards.

BRIEF DESCRIPTION OF THE DRAWINGS

FIG. 5 shows a circuit configuration in which FIG. 3(a) is expanded to allow duplication on a plurality of memory cards;

DESCRIPTION OF SYMBOLS

Figure 1:
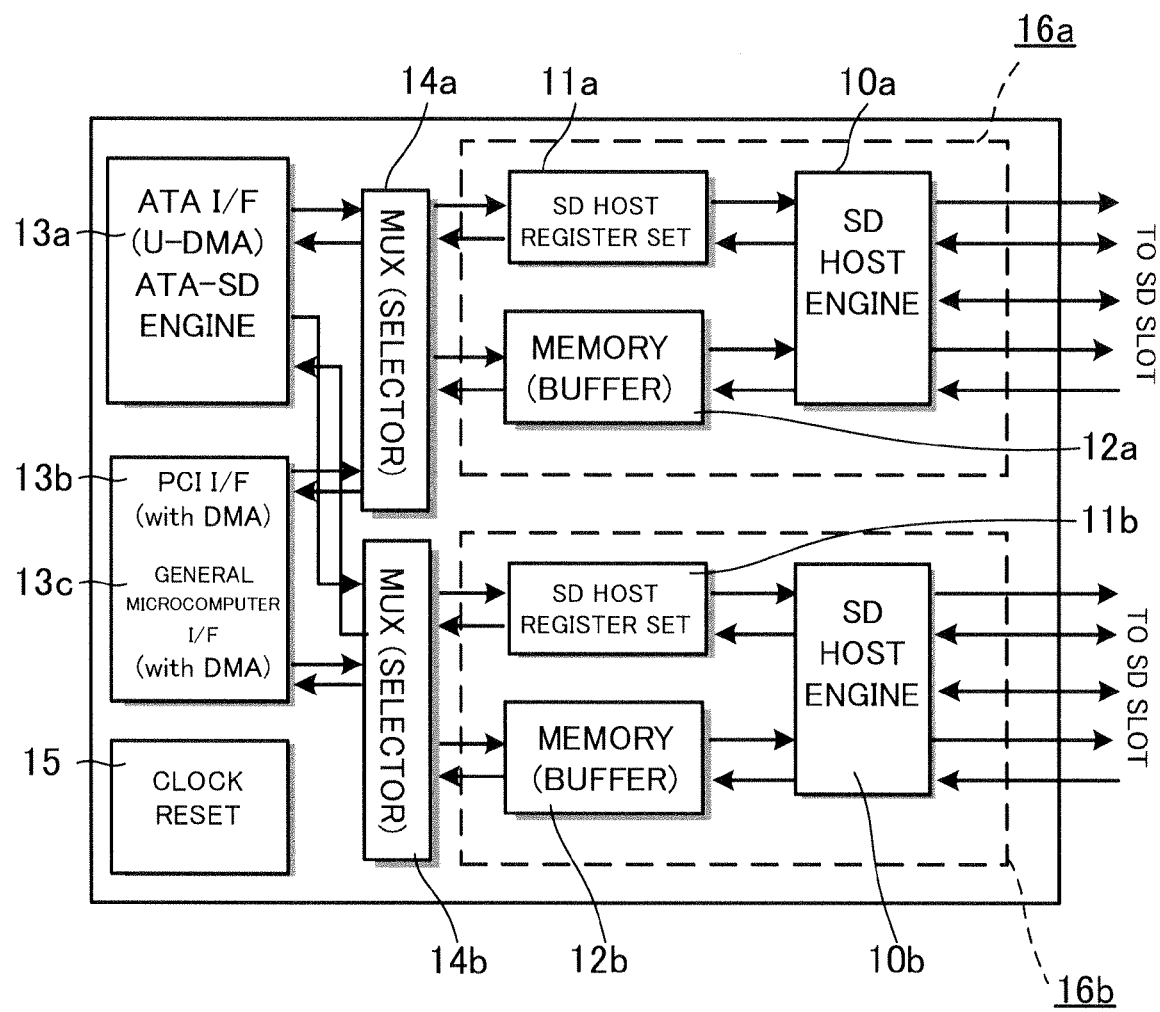
FIG. 1 is a diagram showing an example of functional blocks of an SDIO host controller according to the present invention.

10 SD host engine
11 SD host register (set)
12 memory (buffer)
13 CPU interface
13a ATA interface (ATA/SD engine)
13b PCI interface
13c general microcomputer interface (generic PCI interface)
18 SDIO host controller
20 (20a, 20b) SD slot
21 IDE connector
22 PCI slot terminal
31 (31a, 31b, 31c) host controller
32 (32a, 32b) SD memory card
33 FPGA (or CPU)
34 selector circuit
35 IDE host
36 arbitration circuit (arbitration controller)
37 comparator
38 (38a, 38b) buffer 70 SD memory card reader/writer
71 SDIO host controller
73 USB controller
74 regulator IC
100 SD/SDIO host apparatus
100a PDA
100b notebook computer
100c SD memory card reader/writer
101 SD slot
102 SD/SDIO card application apparatus
102a SD memory card
102b SDIO card
103 SD/SDIO host controller
104 SD/SDIO controller
105 SD bus

BEST MODE FOR CARRYING OUT THE INVENTION

FIRST EMBODIMENT

First, description will be given of an overview of an exemplary SDIO host controller device (which may be simply referred to as a "host controller" hereafter) according to the present invention, and its typical implementations.

[Exemplary SD Host Controller]

FIG. 1 shows an example of the SDIO host controller according to the present invention. As shown in this figure, the controller 18 is a one-chip semiconductor device which has functional blocks including two SD host cores 16. Each core includes an SD protocol engine (an SD host engine 10) of an SD host, and an SD host register set 11 and memory (such as SRAM) 12 that control the SD host engine (like functional blocks are denoted with like reference numerals and distinguished by subscripts a and b). The functional blocks also include three CPU interfaces (an ATA interface 13a, a PCI interface 13b, and a general microcomputer interface 13c) that control the SD host, and selectors (MUXs 14a and 14b) that selects among the CPU interfaces. A prototype resulted in a 144-pin CSP (Chip Size Package) with dimensions of 8 mm by 8 mm by 1.0 mm.

Minimum required parts for a host apparatus with an SD slot to control an SD card application apparatus are: one SDIO host core enclosed with a dashed line; an interface for connecting to a local bus, such as a PCI interface; and a peripheral circuit such as a clock reset circuit. Some one-chip devices having these parts thereon are already commercially available.

However, this host controller 18 is characterized by having a plurality of CPU interfaces that control the SD host, i.e., having the "ATA interface," in addition to the "PCI bus interface" and the "general microcomputer interface" included in the specifications of the SD standard.

—Description of Functional Blocks—

Each functional block will be described below.

(a) SD Host Engine

This is a part that issues SD commands to a target application apparatus (an SD card application device) to control the target application apparatus, and it is the heart of the SDIO host controller.

(b) SD Host Register Set

This is a register specification that conforms to the SD standard (SD Host ver.1.0). Device drivers provided as standard equipment in a general operating system may be directly used.

(c) Memory (Buffer)

This is composed of SRAM and includes two banks of double buffer memory (512 bytes). The memory may be internal or external to the SD host core: whichever is possible. As long as the memory functions as a buffer, the composition is not limited to SRAM.

(d) Clock Reset Section

To adapt to the version upgrade of the SD standard (Physical Specification ver.1.01), the clock frequency has been increased to 50 MHz from the previous 25 MHz and allows faster data transfer. Without the limitation of the standard, it could be operated at still higher speed.

(e) PCI Bus Interface

The PCI bus (Peripheral Component Interconnect bus) is a specification of an internal bus used in data transfer between the CPU system and peripheral apparatus. The PCI bus interface of the SDIO host controller according to the present invention supports the DMA (Direct Memory Access) transfer mode.

(f) General Microcomputer Interface

The general microcomputer interface (generic CPU interface) is an interface for connecting to a microcomputer. The microcomputer is typically embedded in the host apparatus (embedded type). The microcomputer can know the content of the SD host registers (reference numeral 11 in FIG. 1) through the general microcomputer interface. The general microcomputer interface of the SDIO host controller according to the present invention supports the DMA (Direct Memory Access) transfer mode.

The above (a) to (f) are the basic composition of the functional blocks of the SDIO host controller that conforms to the SD standard.

(g) ATA Interface

The ATA interface (which may be simply referred to as an "ATA" hereafter) is one of CPU internal bus interfaces and is typically an interface for connecting a storage device such as a hard disk drive. The ATA is used by connecting an IDE device (such as a hard disk drive) to a standardized connector called IDE. The host controller for the ATA is herein referred to as an "IDE host."

The ATA interface of the SDIO host controller according to the present invention supports the PIO transfer mode (Programmed I/O). In addition, it includes a dedicated DMA controller, thereby supporting the Ultra DMA transfer mode. It may also be configured to support the single-/multi-word DMA transfer mode.

(h) ATA-SD Protocol Conversion Engine

Even though the ATA interface is provided, the SD host engine must be able to interpret ATA commands in order for commands and data to be transmitted to the SD bus. Therefore, a protocol conversion engine for converting ATA commands into SD commands is needed.

The ATA-SD protocol conversion engine is configured such that the SD host engine issues a predetermined SD command in response to a command received at the ATA interface. For example, protocol conversion is performed by predefining a rule (command table) for the SD protocol engine to "issue 'command 18 (CMD 18)' and 'command 12 (CMD 12)' if the command "READ SECTOR" is received.

Table 1 shows exemplary ATA commands supported by the ATA-SD protocol conversion engine. As commands required by the IDE host, it supports ATA device essential commands, as well as commands for notifying of the status of the power management feature set and the status of the SD memory card (connected or disconnected, since the card is removable) (e.g., commands for notifying that the SD memory card is disconnected, the SD memory card has been changed, the SD memory card is write-protected, etc.).

Tables 2 and 3 are exemplary ATA-SD command conversion tables.

TABLE 1

|  | Protocol | ATA | Code |
|---|---|---|---|
| CHECK POWER MODE | ND | M, P | C0h |
| EXECUTE DEVICE DIAGNOSTIC | ND | M | 90h |
| FLUSH CACHE | ND | M | E7h |
| IDENTIFY PACKET | PI | M | ECh |
| IDLE | ND | M, P | E3h |
| IDLE IMMEDIATE | ND | M, P | E1h |
| INITIALIZE DEVICE PARAMETER | ND | M | 91h |
| GET MEDIA STATUS | ND | R | EDh |
| MEDIA EJECT | ND | R | DEh |
| READ DMA | DM | M | C8h |
| READ MULTIPLE | PI | M | C4h |
| READ SECTOR(S) | PI | M | 20h |
| READ VERIFY SECTOR(S) | ND | M | 40h |
| SEEK | ND | M | 70h |
| SET FEATURES | ND | M | EFh |
| SET MULTIPLE MODE | ND | M | C6h |
| SLEEP | ND | M, P | E6h |
| STANDBY | ND | M, P | E2h |
| STANDBY IMMEDIATE | ND | M, P | E0h |
| WRITE DMA | DM | M | CAh |
| WRITE MULTIPLE | PO | M | C5h |
| WRITE SECTOR(S) | PO | M | 30h |

ND Non-data Command Protocol
M: Must
PI: PIO data-in Command Protocol
P: Power Management feature set
PO: PIO data-out Command Protocol
R: Removable Media Status Notification feature set
DM: DMA Command Protocol

TABLE 2

Command Table (ND)

| ATA Command | SDIO Host Controller | SD Command |
|---|---|---|
| CHECK POWER MODE | Report present mode. | N/A |
| IDLE | Return to idle state (resume clock). Set a timer. | N/A |
| IDLE IMMEDIATE | Return to idle state (resume clock). | N/A |
| SLEEP | Control clock (minimum power consumption). | N/A |
| STANDBY | Same as SLEEP since STANDBY mode is not implemented. | N/A |
| STANDBY IMMEDIATE | Same as SLEEP since STANDBY mode is not implemented. | N/A |
| EXECUTE DEVICE DIAGNOSTIC | Issue to both cards and check their state. | CMD13 (SEND_STATUS)? |
| SET FEATURES Sub code; 03h | Set transfer mode | N/A |
| Sub code; 31h | Disable Media Status Notification | N/A |
| Sub code; 95h | Enable Media Status Notification | N/A |
| FLUSH CACHE | Return Status after FIFO data is written. | N/A |
| READ VERIFY SECTOR(S) | Confirm accessibility of LBA and return Status. | CMD18 + CMD12 |
| GET MEDIA STATUS | Return Status from signals such as WP and CD. | N/A |
| MEDIA EJECT | Nothing specific. | N/A |
| INITIALIZE DEVICE PARAMETERS | Not required if CHS conversion. | N/A |
| SEEK | N/A | N/A |

TABLE 3

Command Table (PI/PO/DM)
Data transfer must be done by CMD18/25 because it is much faster than CMD17/24 and make HW simple.

| ATA Command | SDIO Host Controller | SD Command |
|---|---|---|
| IDENTIFY DEVICE | Transfer CSD info when the initialization process | N/A |
| READ SECTOR(S) | Set transfer block counter by sector count and start transfer by CMD18. Decrement counter for each block and stop transfer by CMD12 when counter reach up. | CMD18 + CMD12 |
| WRITE SECTOR(S) | Same as above. | CMD25 + CMD 12 |
| SET MULTIPLE MODE | Set interrupt trigger counter by this command. | N/A |
| READ MULTIPLE | Same as READ SECTOR(S) command except interrupt is generated by a count defined by SET MULTIPLE MODE. | CMD18 + CMD 12 |

TABLE 3-continued

Command Table (PI/PO/DM)
Data transfer must be done by CMD18/25 because it is much
faster than CMD17/24 and make HW simple.

| ATA Command | SDIO Host Controller | SD Command |
| --- | --- | --- |
| WRITE MULTIPLE | Same as above. | CMD25 + CMD12 |
| READ DMA | Same as READ SECTOR(S) command using DMA or Ultra DMA mode which is set by SET FEATURE command. | CMD18 + CMD12 |
| WRITE DMA | Same as above. | CMD25 + CMD12 |

Addressing methods generally include CHA (Cylinder Header Addressing) and LBA (Logical Block Addressing). The SD memory cards employ LBA, and the IDE host apparatus employs CHS. Therefore, address conversion from CHA to LBA is necessary. It should be noted that the conversion must be performed such that the capacity of the SD memory is not exceeded when the IDE host apparatus accesses the last address in CHA.

In addition, if the command response from the SDIO card application apparatus is late, measures should be taken such as terminating the processing after certain time period to prevent the system of the host apparatus from hang-up.

MUX:

As described above, the SDIO host controller according to the present invention has a plurality of interfaces. Therefore, which interface is applied to communication should be set with a selector switch (e.g., a DIP switch) in advance. The MUX acts as a selector for selecting among the interfaces, so to speak.

—ATA Transfer Modes—

Now, a brief description of the ATA transfer modes will be provided. The ATA transfer modes include (i) the PIO transfer mode in which the CPU directly performs data transfer, and (ii) the Ultra DMA transfer mode implemented by a dedicated DMA controller. Control methods and timing for the ATA signals are defined in detail for each transfer mode.

(i) PIO Transfer Mode

The PIO (Programmed I/O) transfer mode involves the CPU directly performing data transfer. IN/OUT instructions of the CPU are used to read from and write to a buffer memory space, and the reading and writing are repeated by LOOP instructions or the like. Since this method causes access cycles for the registers and the main memory to be generated on the system bus, the speed of the system bus governs the transfer rate.

(ii) Ultra DMA Transfer Mode

The ATA includes an interface for high-speed data transfer called the Ultra DMA transfer, and a data transfer mode using the Ultra DMA interface is called the Ultra DMA transfer mode. In this mode, a DMA controller inside an IDE controller that acts as the bus master on the PCI bus performs data transfer. The data transfer on the PCI bus equals the data transfer performed by the normal PCI bus master. Since accesses on the side of the ATA device are performed by the IDE controller itself with its own DMA controller irrespective of the system bus, the access cycles generated on the system bus are only those for the main memory. This allows faster data transfer than in the cases of other transfer modes.

There is also the single-/multi-word DMA transfer mode, which will not be described here (although named as DMA, it is completely different from the Ultra DMA transfer mode).

Referring to FIGS. 2(a) to (d), description will be given below of practical implementations that use the host controller illustrated in FIG. 1.

—First Implementation—

While there are various host apparatus, host apparatus having an internal hard disk drive usually include an IDE host and therefore an ATA interface, as described above.

Figure 2:
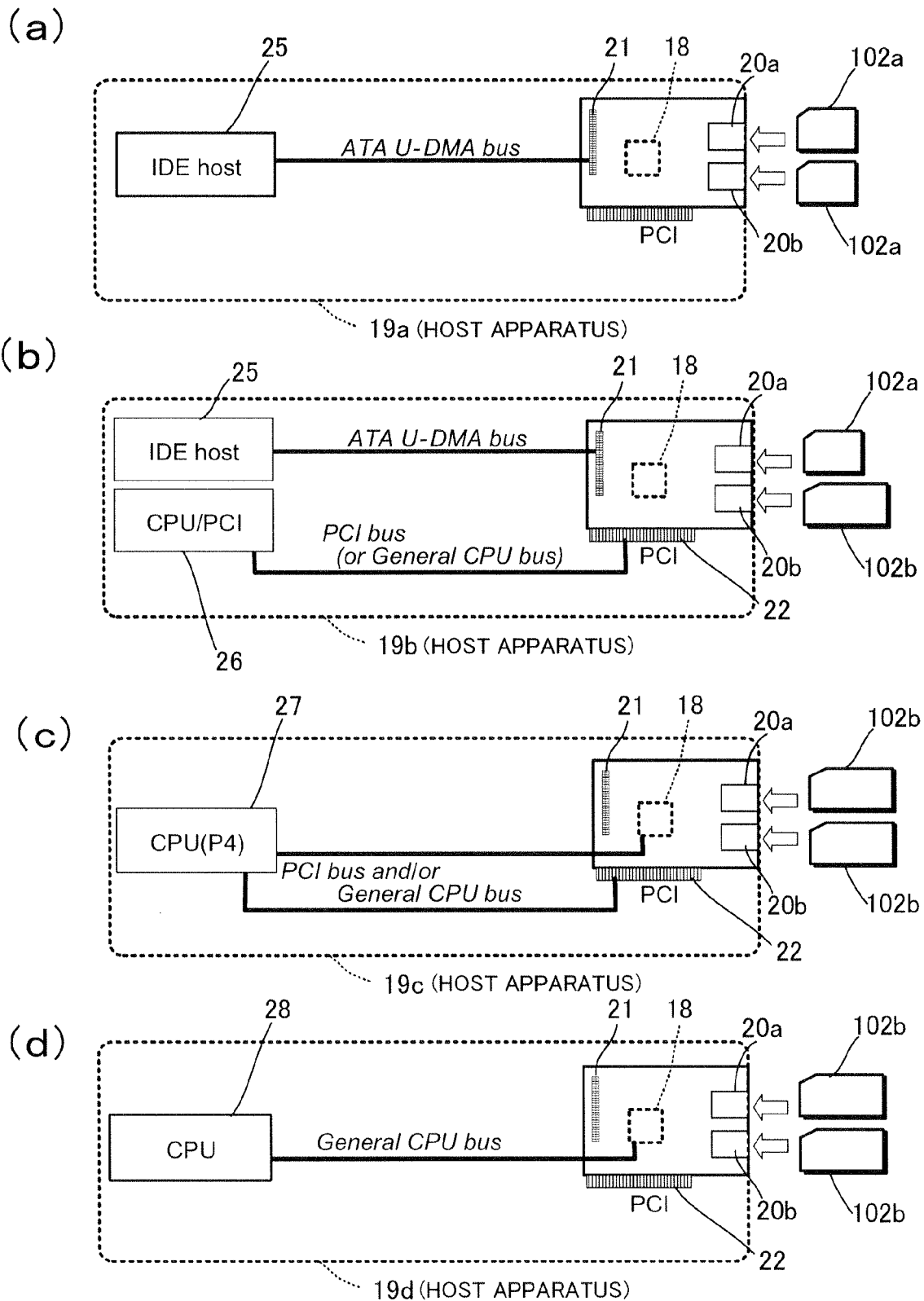
FIGS. 2(a) to (d) are diagrams showing practical implementations that use the host controller illustrated in FIG. 1.

As shown in FIG. 2(a), the above-described host controller 18 shown in FIG. 1 may be applied to those apparatus with an IDE host. Then, connection can be made from an ATA interface 21 to an IDE host 25 of a host apparatus 19a via an ATA Ultra DMA bus (ATA U-DMA bus).

The IDE host 25 is being recognized by the CPU or the like (not shown) of the host apparatus 19a from the beginning, and the protocol conversion between the ATA and the SD is performed by the host controller 18. Therefore, no driver software or firmware for recognizing the SD host needs to be installed on the host apparatus.

Since the ATA is basically an interface for connecting a storage device, its typical implementation is connection to SD memory cards as in FIG. 2(a) rather than to SDIOs. However, connection to SDIOs is also possible if they have a memory function.

Thus, according to the usage as in this implementation, the SD memory cards can replace a conventionally connected hard disk to reduce the size of the apparatus. Alternatively, the advantage of easy removability of the SD memory cards can be taken to use the SD memory cards as an auxiliary storage medium for the hard disk.

In addition, since the Ultra DMA transfer with a high transfer rate is used, the speed of data write/read is increased compared to data write/read on the SD memory cards via a conventional local bus on a software basis. This speedup is perceptively dramatic.

—Second Implementation—

If a host apparatus includes an IDE host and a microcomputer (the host of a generic CPU) or PCI host, interfaces for these two may be used to connect to the host controller.

As shown in FIG. 2(b), the above-described host controller 18 shown in FIG. 1 may be applied to a host apparatus 19b having both an IDE host and a CPU or microcomputer with a PCI bus. Then, connection can be made from an ATA interface 21 to the IDE host 25 of the host apparatus 19b via an ATA Ultra DMA bus (ATA U-DMA bus), and connection can be made to the CPU or the like of the host apparatus 19b via a PCI bus 22 (or a generic CPU bus (not shown)).

Most personal computers in recent years include, as standard equipment, both the IDE host 25 and the CPU with the PCI bus. Even a host apparatus without a PCI bus may connect to the general microcomputer interface of the host controller 18 from a general port such as a GPIO if the host apparatus has a microcomputer.

Thus, connecting the host controller by using the two interfaces in this manner allows operating an SD memory card via the ATA interface, as well as controlling various SDIO card application apparatus (e.g., a wireless LAN card) via the PCI or general microcomputer interface.

—Third and Fourth Implementations—

As shown in FIG. 2(c), connection can also be made to two SDIO card application apparatus via a PCI bus interface. In this manner, a single host apparatus can have two SD bus slots that are SDIO-capable. This implementation is used mainly when the SDIO host is connected to a general-purpose personal computer.

As shown in FIG. 2(d), connection can also be made to two SDIO card application apparatus via a general microcomputer interface such as a GPIO port of a microcomputer. In this manner, two SDIO hosts can be included in a single host apparatus. This implementation is used mainly when the SDIO host is embedded in an apparatus without a PCI bus, such as a PDA or a digital video camera.

The above implementations are only exemplary, and none of them are exclusive. Appropriate combinations, modifications, and alterations of these implementations in the light of the normal creative level of those skilled in the art will also fall within the scope of the present invention.

EXAMPLES

Description will be given below of implementations of application products that use the SDIO host controller device according to the present invention.

Second Embodiment

Memory Card Duplication Apparatus

As described above, the SDIO host controller illustrated in the first embodiment can directly control SD card application apparatus by using the ATA commands. Therefore, two SDIO host controller devices and one ATA host (a logic circuit for transmitting the ATA commands) may be combined to create a dedicated circuit for duplicating an SD memory card (a duplication apparatus).

Typically, when data in an SD memory card is duplicated on (copied into) another SD memory card, the entire data is first read into the host apparatus. Then, the other SD memory card into which the data is copied is inserted into the host apparatus, and the entire data is written to the other SD memory card. The data duplication is thus completed. However, this approach involving reading and writing of data on a software basis takes time and effort.

Coupling the host controllers by the ATA interface to create a dedicated circuit for transferring data in the Ultra DMA transfer mode can increase the speed and reduce the effort.

Example 1

SD Memory Card Duplication Method (1:1)

[Circuit Configuration]

FIG. 3(a) shows an exemplary SD memory card duplication circuit that uses the SDIO host controller devices according to the present invention. This circuit is a dedicated circuit by which data recorded on a memory card is duplicated on (copied into) another memory card. This circuit includes two SDIO host controllers 31a and 31b, a logic circuit, e.g., an FPGA 33, and one selector circuit 34.

As shown in this figure, the FPGA 33 and the two host controllers 31a and 31b are coupled by a bus for data transfer (a data bus), as well as signal lines for transmitting and receiving the ATA commands.

All the signal lines conform to the ATA standard. For the sake of simplicity, signal lines for transmitting a chip select signal (CS[1:0]) used to access the registers of the ATA or an address signal (DA[2:0]) used to access data or a data port are not shown.

Furthermore, the two host controllers 31a and 31b are connected with each other such that their respective ATA interfaces (specifically, the Ultra DMA interfaces) are physically direct-coupled. Data is thus transferred in the Ultra DMA transfer mode.

The first SDIO host controller 31a is for reading, and the first SD memory card 32a, which is the duplication source (the master), is connected thereto. The second SDIO host controller device 31b is for writing, and the second SD memory card 32b, which is the duplication target (the copy target), is connected thereto.

FIG. 3(b) shows an exemplary hardware implementation for providing the above circuit configuration. As in this figure, the simplest implementation is to embed an IDE host 35 that supports several simple ATA commands into the FPGA 33. Of course, the selector 34 may be embedded into the FPGA 33. When the bus is shared, it is necessary to provide an arbitration circuit (an arbitration controller) 36 along with the IDE host 35.

[Data Transfer Method]

The FPGA 32 uses the ATA command signals to control the timing of starting and terminating data transfer between the two SDIO host controller devices 31a and 31b. However, data transferred during duplication is directly transferred via the respective Ultra DMA interfaces of the two SDIO host controller devices (i.e., the data itself bypasses the FPGA 32).

Figure 3:
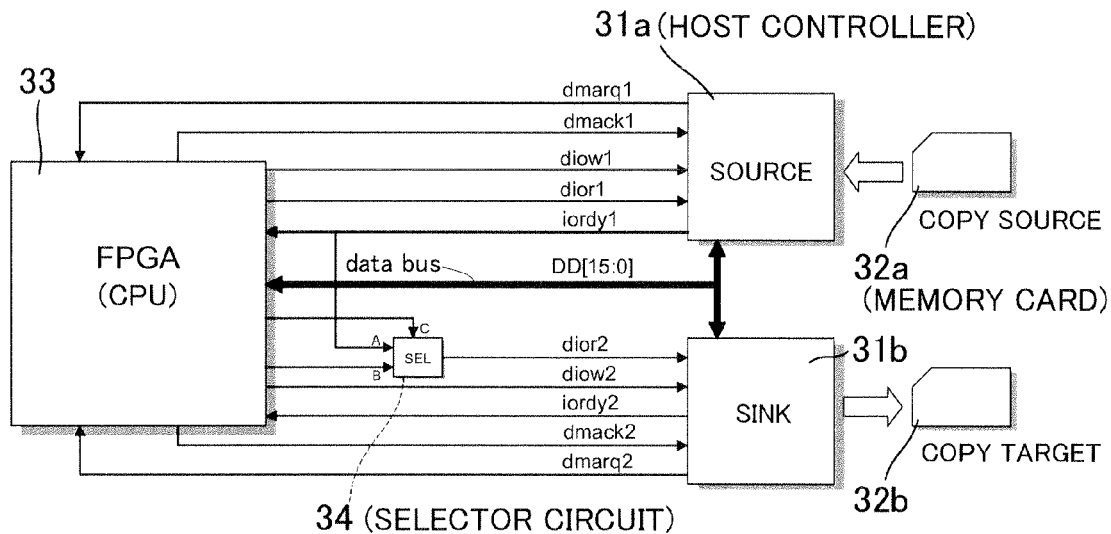
FIG. 3(a) is a diagram showing an exemplary SD memory card duplication circuit that uses the SDIO host controller device according to the present invention.
FIG. 3(b) is a diagram showing an exemplary hardware implementation for providing the circuit configuration of FIG. 3(a)
Figure 3:
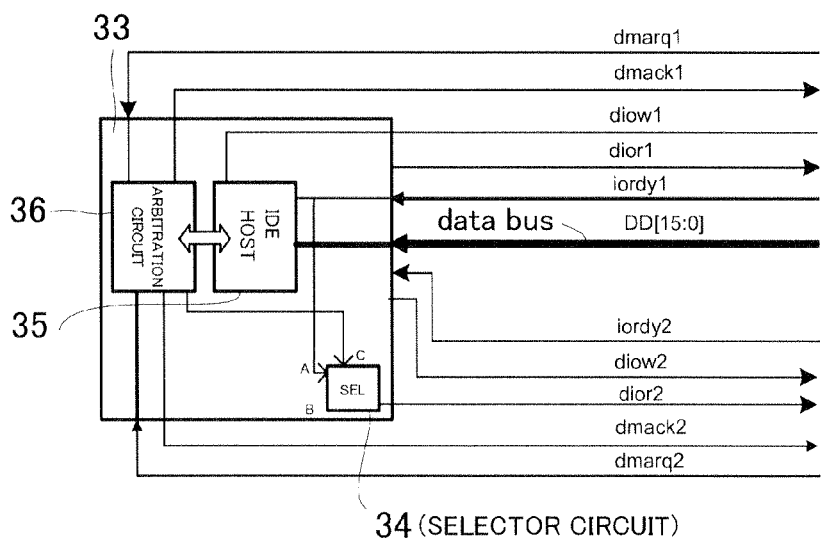

This circuit uses the ATA interface of the host controller to control input/output of data to/from the SD memory cards with the ATA commands issued by the central control chip (the IDE host in FIG. 3). With the ATA commands, the duplication source is set to the "Read mode" of the Ultra DMA, and the copy target is set to the "Write mode" of the Ultra DMA. By the time the transfer is ready, dmarq signals are issued. Respective dmack signals are controlled to manage the start and end of the data transfer.

Each of the dmack and dmarq signals is one of ATA signal names. They are in a handshake relationship, i.e., the data transfer is started when both signals are made.

Specifically, a strobe signal is realized using data signal lines: iordy for the transmitting side and dior for the receiving side. The data transfer protocol is generally implemented in the following procedure.

Figure 4:
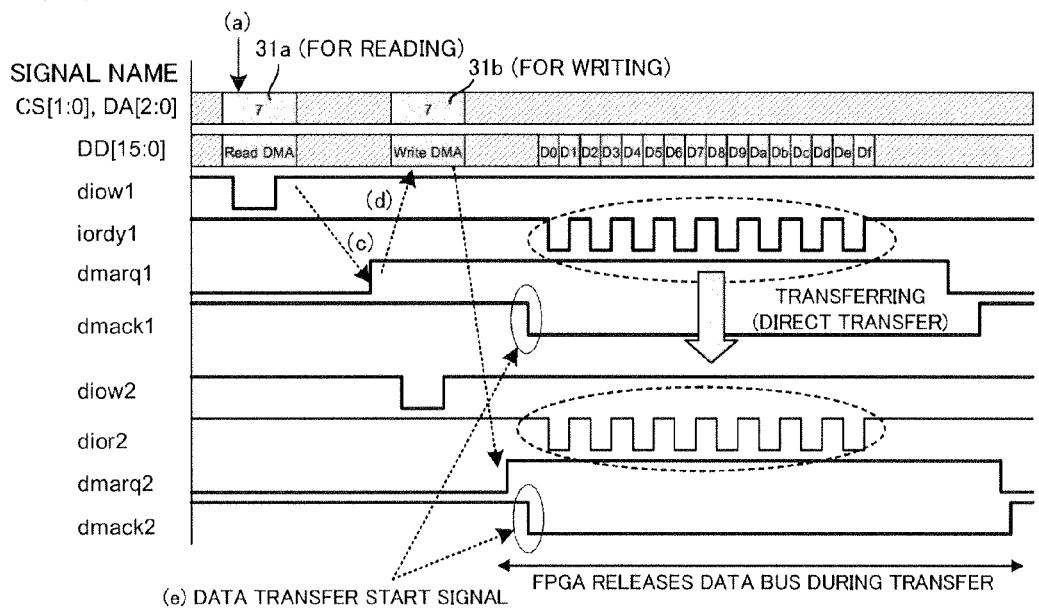
FIG. 4(a) is a diagram showing a protocol timing chart for ATA signals issued by an FPGA.
FIG. 4(b) is a diagram for describing the state of a circuit during data transfer.
Figure 4:
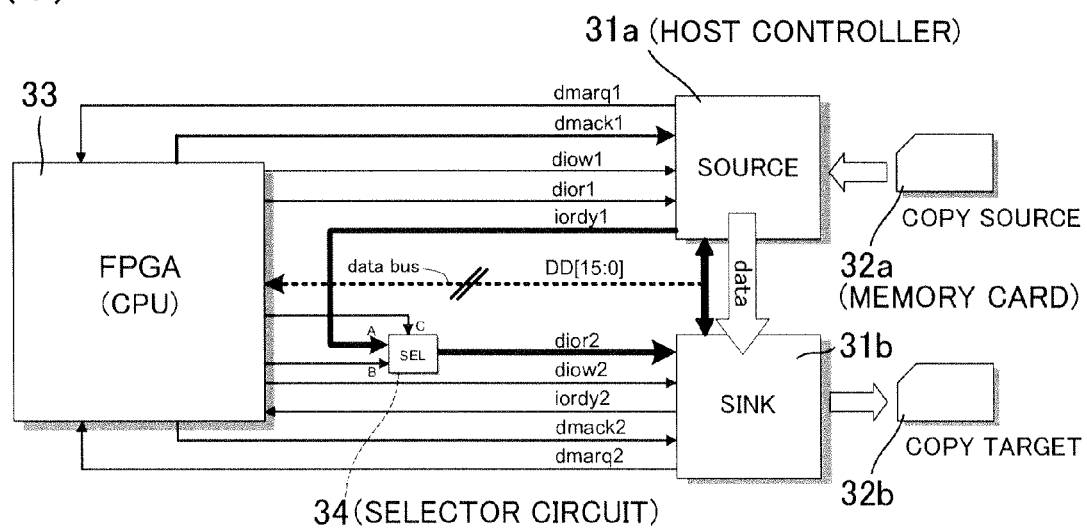

FIG. 4(a) is a diagram showing a protocol timing chart for the ATA signals issued by the FPGA.

(a) The FPGA 33 issues a read DMA command to the reading host controller device 31a.

(b) On receiving the read DMA command (Read DMA), the reading host controller 31a reads data from the memory card 32a, which is the copy source, and accumulates the data in the buffer 12a of the host controller 31a.

(c) Once the data is accumulated in the buffer, the host controller 31a makes a DMA request signal (dmarq1). This allows the FPGA 33 to know the data transfer is ready and to make a DMA request signal (dmarq1).

(d) After receiving the DMA request signal (dmarq1), the FPGA issues a write DMA command (Write DMA) to the writing host controller 31b.

(e) After receiving a DMA request signal (dmarq2) from the reading host controller device, the FPGA issues a data transfer start signal (dmack) while electrically coupling "iordy1" and "dior2" by switching the selector circuit.

FIG. 4(b) is a diagram for describing the state of the circuit during the data transfer, in which the selector circuit is shown electrically coupling "iordy1" and "dior2." Here, "iordy1" operates as a data strobe signal.

In this manner, the selector 34 is switched just before the start of the data transfer, so that the path is switched to transmit the strobe signal to the writing host controller 31b rather than to the FPGA (this releases the FPGA from the data bus during the data transfer).

In brief, the FPGA 33 communicates with the host controllers 31a and 31b with ATA commands until the data transfer is ready. Just before the data transfer, the selector circuit 34 is switched to directly couple the Ultra DMA interfaces of the host controllers 31a and 31b. This allows the Ultra DMA transfer without the intervention of the FPGA 33. According to this data transfer mode, the strobe signal and data signal are directly transferred from the first SDIO host controller device 31a, i.e., the copy source, to the second SDIO host controller device 31b, i.e., the copy target. Since the transferred data bypasses the FPGA, the data transfer rate as well as the transfer efficiency are high.

When the apparatus configuration of this example 1 is employed, even if the SDIO host controller devices include two SDIO host cores, the master SDIO host controller device 31a uses only one core and does not use the other one.

Example 2

SD Memory Card Duplication Apparatus (1:N)—

The example 1 has been described for the case where the duplication source card and the duplication target card is in a one-to-one relationship. This can be expanded to duplication from one duplication source card to a plurality of cards at the same time.

Figure 5:
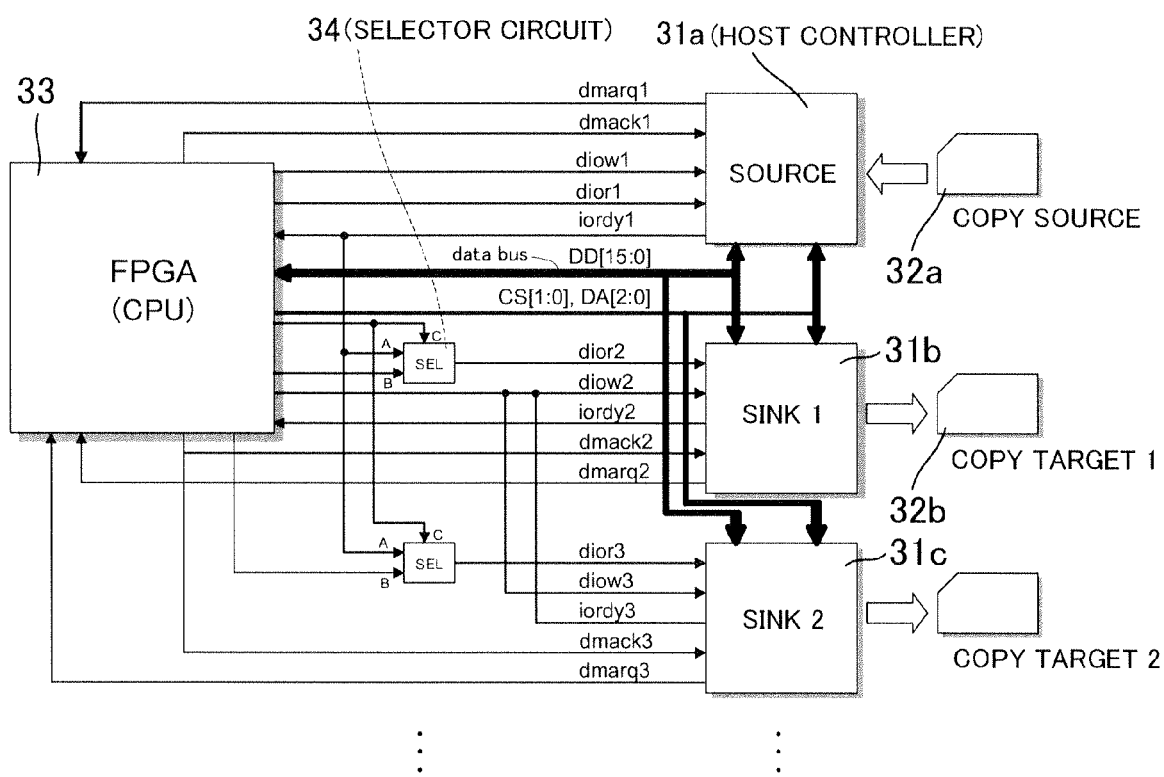

FIG. 5 shows a circuit configuration in which FIG. 3(a) is expanded to allow duplication on a plurality of memory cards. Second and third SDIO host controllers 51b and 51c for writing (duplication targets) are shown to be connected to the first SDIO host controller 51a for reading (duplication source). Of course, this circuit may be implemented with a single FPGA as in FIG. 3(b).

By connecting more DMA interfaces along with branching the selector circuits and dior and diow signals, further more cards may be duplicated at the same time.

(Variations of Examples 1 and 2)

The SDIO host controller illustrated in the first embodiment includes two SD host cores. On the other hand, the ATA specifications include two IDE connectors called primary and secondary. Therefore, seen from the ATA host, application apparatus connected to the two SD host cores respectively may be used with distinction of the master/slave.

However, when a dedicated apparatus of the SD memory card duplication circuit as in the example 1 or 2 is configured, settings may be modified to write the same data to both cards by the writing host controller without distinction of the master/slave. In this manner, a single writing host device may be used to write the same data to two cards. For the reading host controller, the master/slave needs to be distinguished and a situation of using the both at the same time is not likely.

Example 3

—Verification—

In verifying the written data to check for the correctness of the copying, there has been a problem that the verification is lengthy because it is done on a software basis.

Figure 6:
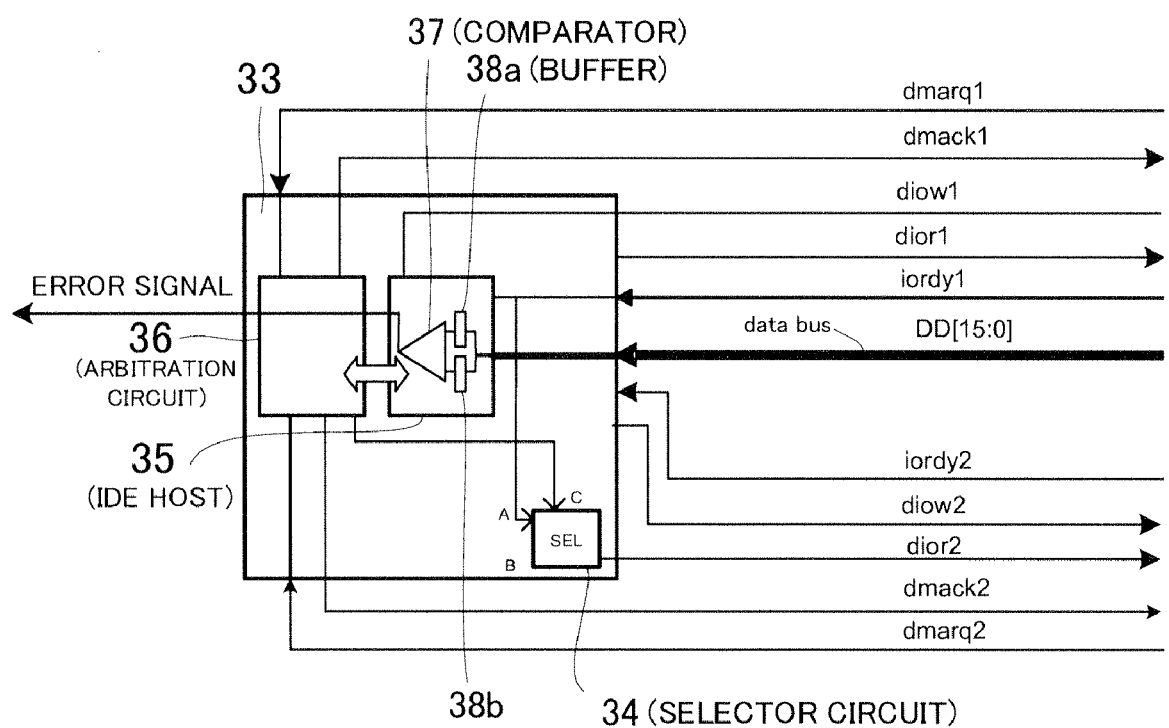
FIG. 6 is a diagram showing an exemplary hardware implementation of a data comparator (verifier)

As shown in FIG. 6, a comparator 37 and buffers 38a and 38b may be provided in the IDE host composed of the FPGA. These allow address-by-address comparison of the data between the duplication source and target on a hardware basis, thereby allowing faster verification.

If an address having a data mismatch is discovered as a result of the verification, an error flag is set and an error signal is transmitted. This signal may be used to light an LED, to display the mismatch address on a liquid crystal display, and so forth.

Since all the cases described in the examples 1 to 3 illustrate the invention made in the course of developing the SDIO host controller, the description has assumed the use of SD memory cards. However, the same operational procedure may be followed to configure these memory card duplication apparatus even in the case where the first and second host controller device with an ATA interface (and a command interpreter) includes a host interface other than the SDIO, for example, a Compact Flash (R) or a Memory Stick (R).

Third Embodiment

—SD Memory Card Reader/Writer—

The USB (Universal Serial Bus) interface is a versatile interface external to the CPU that can connect to various apparatus. There have been SD memory card reader/writers that connect to a USB terminal. However, they include a USB controller and an SD host controller, and involve converting data received by the USB into SD data such as by firmware and transmitting the data to the SD such as via a general microcomputer interface. Thus, since the data is converted on a software basis, reading and writing is slow and is on the order of 8 Mbyte/sec at the most.

On the other hand, various USB controllers have been developed, including what is called a bridge chip that allows bridge conversion between the ATA host and the USB.

The SDIO host controller according to the present invention includes the ATA interface and the ATA-SD protocol conversion engine. Therefore, a USB controller with the ATA bridge function and the SDIO host controller according to the present invention may be connected via the ATA-Ultra DMA bus.

Figure 7:
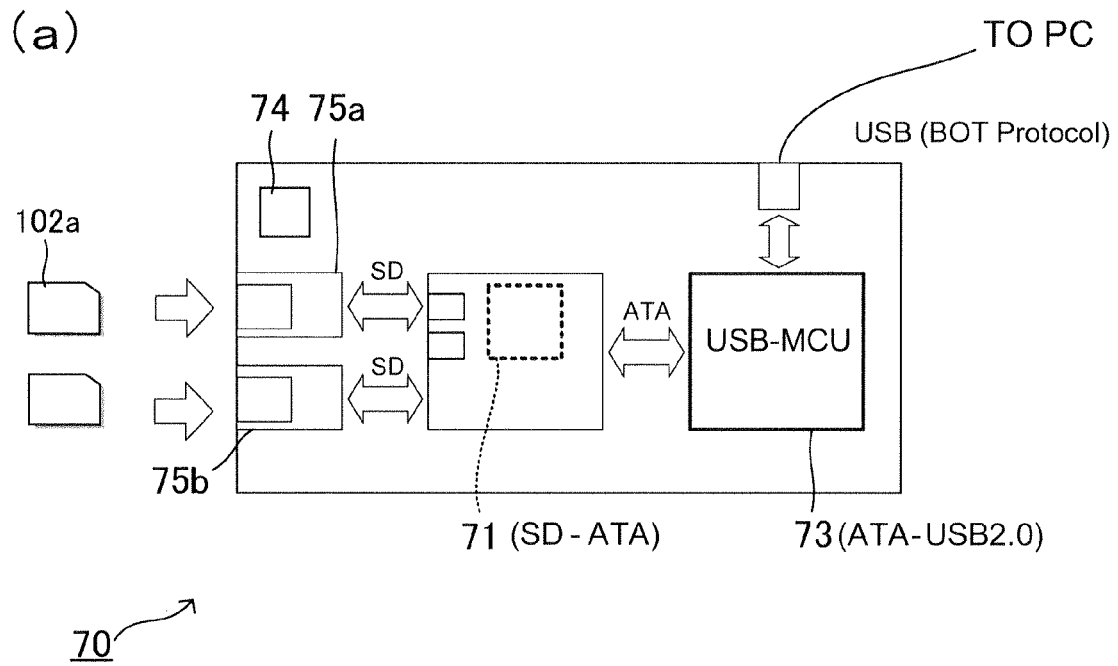
FIG. 7(a) is a block diagram showing an example of an SD memory card reader/writer that uses the SDIO host controller according to the present invention.
FIG. 7(b) is a variation of FIG. 7(a) in which communication with a USB controller is performed via a general microcomputer interface rather than an ATA interface.
Figure 7:
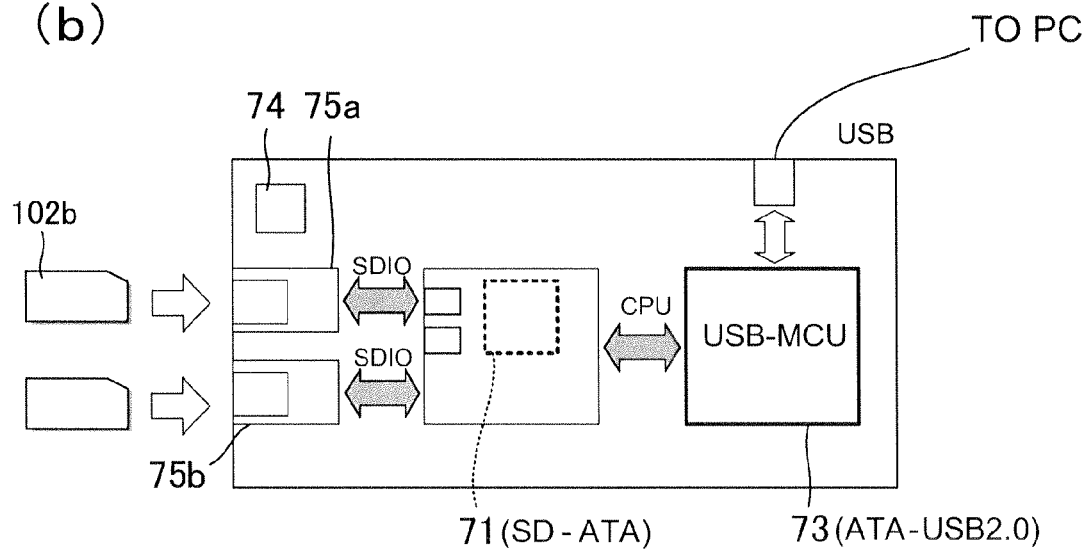

FIG. 7(a) is a block diagram showing an example of an SD memory card reader/writer that uses the SDIO host controller according to the present invention. As shown in this figure, the card reader/writer 70 includes a host controller 71 according to the present invention (which may be the same as the one denoted by reference numeral 18 in FIG. 1), a USB controller (ATA-USB 2.0) 73 with the ATA bridge function, and SD slots 75a and 75b. The host controller (SD memory card-capable) and the USB controller are connected with each other by an Ultra DMA bus via the ATA interface. Since the power can be supplied from the USB terminal, a regulator IC 74 is adapted to provide the power to the entire apparatus. SD memory cards 102a are connected to the host controller on the SD side.

The USB host resides in the host apparatus (e.g., a PC) and communicates according to the BOT (Bulk Only Transfer) protocol. The USB varies in its class specifications depending on the type of the apparatus to be connected. The BOT protocol is a data transfer protocol class (mass storage class) for data transfer to/from a mass storage device.

In this manner, since the data transfer is performed on a hardware basis with connection via the ATA-Ultra DMA bus, the transfer rate is dramatically increased compared to conventional SD memory card reader/writers.

—Variation—

FIG. 7(b) is a variation of FIG. 7(a) in which the communication with the USB controller is performed via a general microcomputer interface rather than the ATA interface.

In this manner, the microcomputer included in the USB controller can directly control the SDIO registers of the host controller. Therefore, not only SD memory cards but also SDIO card application apparatus (e.g., an SDIO wireless LAN card) can be operated.

It is noted that some SDIO card application apparatus connected may require developing firmware, or developing driver software for the host apparatus. It may also be necessary to select among the communication protocols for use in communication with the USB controller, for example, to employ the BOT protocol or to employ another communication protocol.

—Further Example—

Like USB controllers with the IDE host, there are also IEEE 1394 controllers with the IDE host. Therefore, according to the above examples and their variations, replacing the USB controller with an IEEE 1394 controller realizes an IEEE 1394-capable ultrafast SD card reader/writer.

Fourth Embodiment

Since the SD memory card reader/writer described in the third embodiment includes the ATA interface, it is quite easy to provide an IDE connector for connecting with the ATA interface of the host controller.

Figure 8:
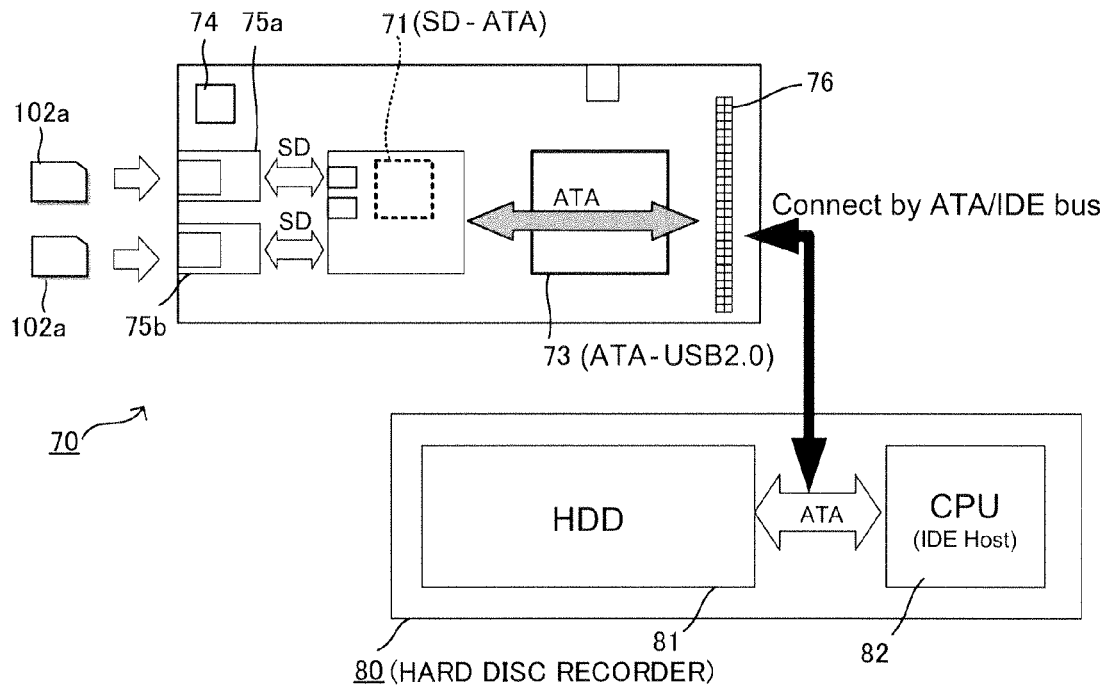
FIG. 8(a) shows the SD memory card reader/writer 70 provided with an IDE connector 76 of e.g., 2.5 inch and connected to a hard disk recorder 80 by an ATA/IDE bus.
FIG. 8(b) shows the SD memory card reader/writer further provided with a slot 77 for a PCI bus interface.
Figure 8:
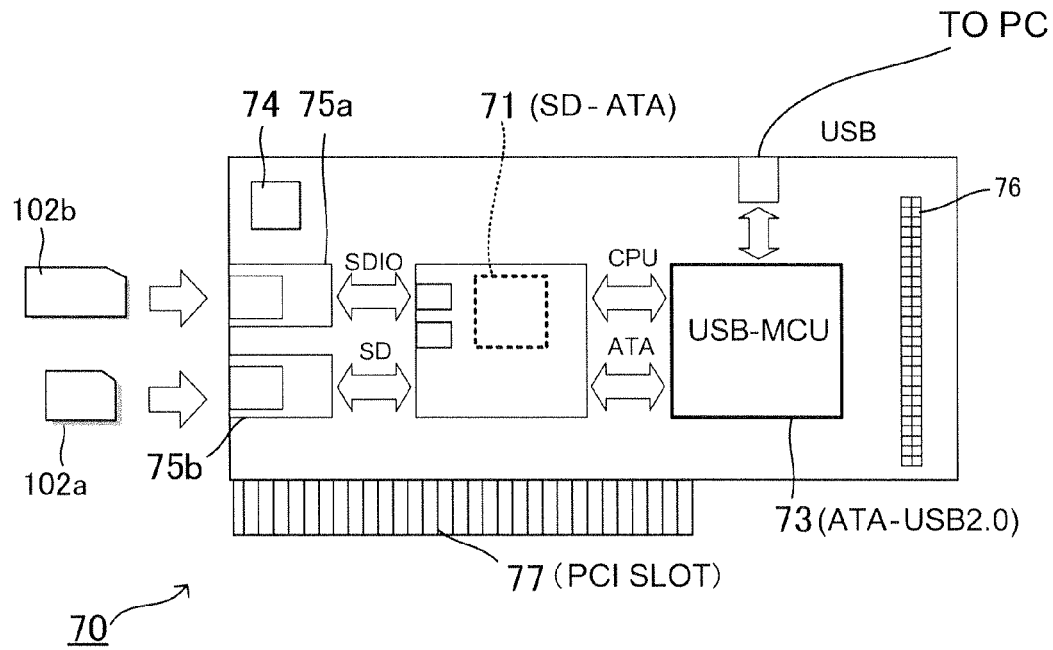
Figure 9:
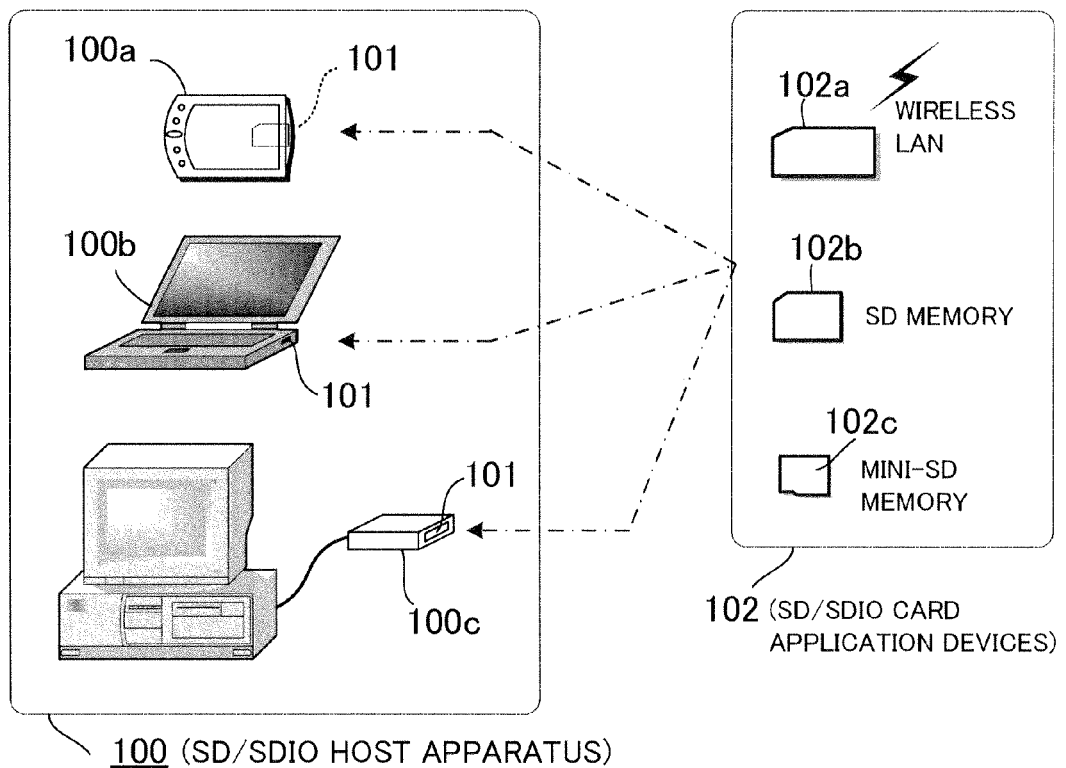
FIG. 9(a) is a diagram showing exemplary SD host apparatus 100 and SD card application apparatus 102.
FIG. 9(b) is a diagram schematically showing a host apparatus 100 being connected with an SD card application apparatus 102 via an SD bus 105.
Figure 9:
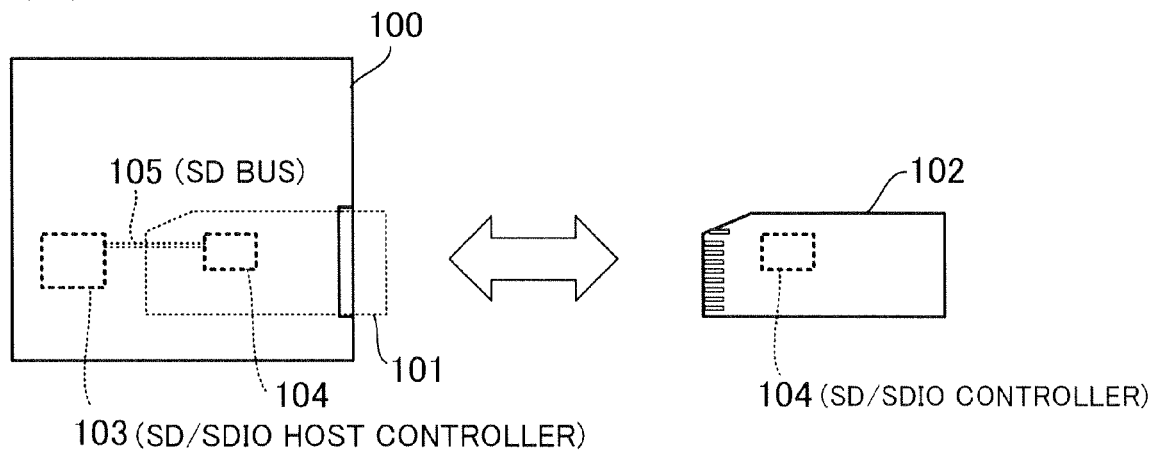

FIG. 8(a) shows the SD memory card reader/writer 70 described in FIG. 7(a) provided with an IDE connector 76 of e.g., 2.5 inch and connected to a hard disk recorder 80 by an ATA/IDE bus. The hard disk recorder 80 includes a hard disk drive 81 and a CPU 82 (the IDE host), which are connected via an ATA interface.

According to the ATA specifications, one IDE connector may have up to two devices (device 0 and device 1) connected thereto. The device 0 is called primary and the device 1 is called secondary.

Therefore, when the SD memory card reader/writer shown in FIG. 8(a) is connected as a secondary device for the hard disk recorder 80, the hard disk recorder 80 can immediately recognize the host controller 81 and control the SD memory cards.

Of course, the connected apparatus is not limited to a hard disk recorder but may be any host apparatus with an IDE host. Examples may include apparatus that basically have a hard disk drive connected thereto, such as a personal computer, an audio player with an internal hard disk, and so forth.

It is noted that the usage as shown in FIG. 8(a) is a typical example of the first implementation (FIG. 2(a)) in the above-described first embodiment.

As in FIG. 8(b), further providing a slot 77 for a PCI bus interface facilitates connection to various host apparatus via various CPU interfaces, thereby further facilitating the development of host apparatus.

INDUSTRIAL APPLICABILITY

Since the SDIO host controller device according to the present invention has a plurality of CPU interfaces including an ATA interface, it can be readily connected to various host apparatus. In addition, since the ATA-SD protocol conversion engine is provided, the SDIO host controller according to the present invention is only recognized as an IDE device by the IDE host and therefore does not require driver software or firmware.

Furthermore, when a connection is made to a bus external to the host apparatus via a USB-ATA bridge chip, the data transfer rate is dramatically increased from the conventional data transfer rate, because the ATA-SD protocol conversion engine performs protocol conversion on a hardware basis.

Thus, the SDIO host controller device according to the present invention eliminates the need of developing driver software or firmware and facilitates the developing environment for SD host apparatus to a greater extent. The industrial applicability is significant.

The invention claimed is:

1. An SDIO (Secure Digital Input Output) host controller as a one-chip semiconductor integrated circuit device, characterized by comprising: two or more cores of an SDIO host, each core including an SD (Secure Digital) host engine and an SD host register set and memory that control the SD host engine independently: a plurality of CPU interfaces that control the SDIO host; at least an ATA interface and an ATA-SD protocol conversion engine that supports ATA device essential commands, as well as commands for notifying of the status of a power management feature set and status of the SD memory card: and two or more selectors that select among the CPU interfaces.

2. The SDIO host controller according to claim 1, characterized in that the ATA interface includes an Ultra DMA controller.

3. The SDIO host controller according to claim 1, characterized in that the CPU interfaces further includes a PCI bus interface and/or a general microcomputer interface besides the ATA interface.

4. An SD memory card duplication apparatus for duplicating data recorded on an SD memory card, characterized by comprising: at least two SDIO host controllers including an ATA interface and an ATA-SD protocol conversion engine that supports ATA device essential commands, as well as commands for notifying of the status of a power management feature set and status of the SD memor card; a logic circuit functioning as an IDE host; and a selector circuit.

5. The SD memory card duplication apparatus according to claim 4, characterized in that the IDE host and the selector circuit are composed of an FPGA (Field Programmable Gate Array).

6. The SD memory card duplication apparatus according to claim 5, wherein the IDE host controller further includes a comparator and two buffers so that data verification can be performed by comparing address-by-address data between a duplication source and a duplication target on a hardware basis.

7. An SD memory card reader/writer characterized in that an SDIO host controller according to claim 1 and a USB controller having an ATA bridge function are connected by an Ultra DMA bus via respective ATA interfaces of the controllers.

* * * * *